April 11, 1967  L. E. OBERHOLTZ  3,313,401

RADDLE CONVEYOR

Filed Sept. 23, 1965

Inventor
Lester E. Oberholtz
By Kenneth MacNichol
Attorney

3,313,401
RADDLE CONVEYOR
Lester E. Oberholtz, Independence, Mo., assignor to Allis-Chalmers Manufacturing Company, Milwaukee, Wis.
Filed Sept. 23, 1965, Ser. No. 489,620
1 Claim. (Cl. 198—175)

This invention relates generally to raddle chain conveyors particularly for use in a combine harvester for moving material such as grain over a floor.

It is an object of this invention to provide an improved raddle assembly which is easier to assemble in the factory and is easier to service in the field.

A further object of this invention is to provide a raddle assembly wherein the fastening means for connecting the raddle slat to the chains is positioned so that it is not subject to frictional contact with the skid rails.

A further object of this invention is to provide a raddle assembly wherein the raddle slat member forms an integral part of the link of the chain.

These and other objects of invention will become more apparent as the following description describes in detail the invention comprehended.

Referring to the drawings.

Figure 1:
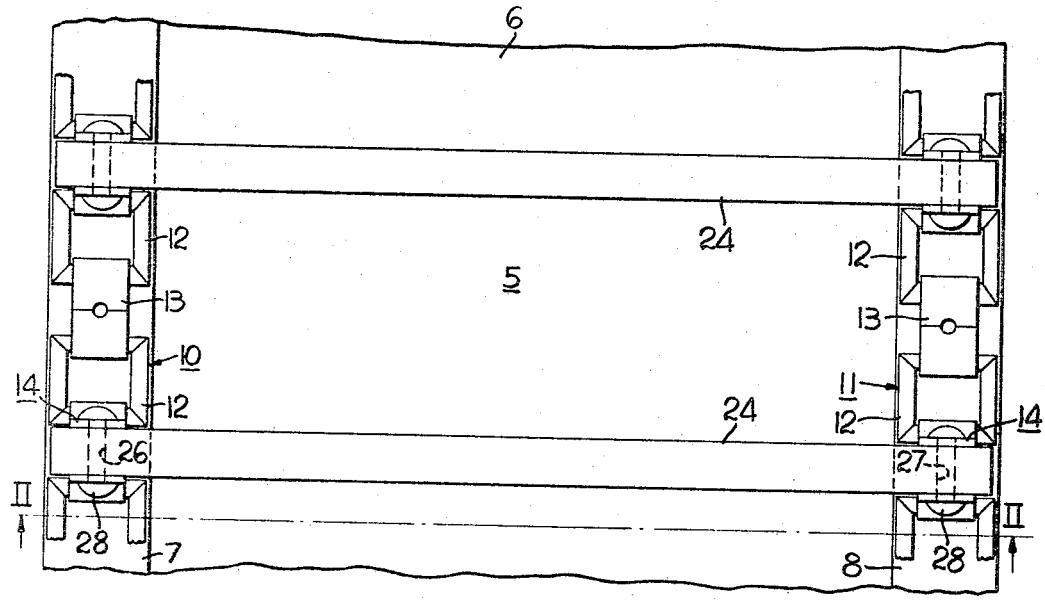
FIG. 1 is a plan view of a portion of a raddle conveyor embodying the invention.
Figure 3:
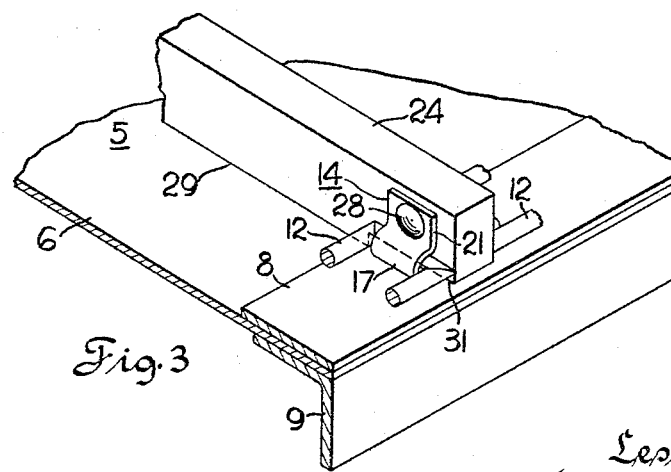
FIG. 3 is an isometric view of a portion of the conveyor of FIG. 1 with parts removed for clarity of illustration; and, FIG. 4 is a side view of a raddle link.

Referring to FIG. 1, it is seen that a raddle conveyor 5 has been provided which operates in a conventional manner over a floor 6 and sprockets (not shown). This floor 6 includes transversely spaced apart skid rails 7 and 8 attached to the floor adjacent the longitudinal sides thereof. Floor 6 is supported on angle irons 9 (FIG. 3). A pair of transversely spaced endless chains 10 and 11 are positioned to move over floor 6 in contact with skid rails 7 and 8 respectively. Each chain is made up of a series of links including a square link 12, connector link 13 and a raddle slat link 14. A third chain could be used if the conveyor is unusually wide and additional support for the midportion of the slats is desired or even a single chain could be used.

Figure 2:
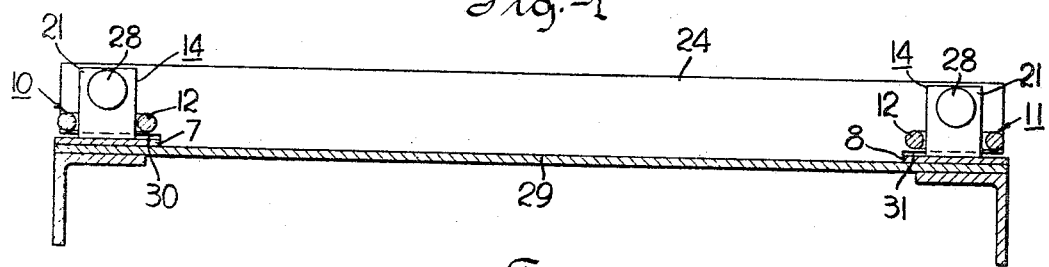
FIG. 2 is a section view on line II—II of FIG. 1.
Figure 4:
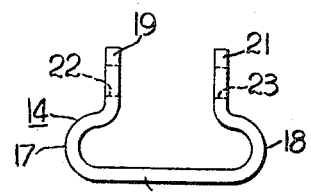

The raddle slat links have a generally forked or U-shaped configuration as shown in FIG. 4. This configuration includes a base portion 16 (see FIG. 4) the lower portion of which contacts the skid rail when the conveyor is moving over the upper surface of floor 6. Base portion 16 is provided at each end thereof with an outwardly curved portion 17 and 18 which terminate in upwardly extending portions 19 and 21, respectively. Upwardly extending portions 19 and 21 are provided with apertures 22 and 23 respectively. A raddle slat 24 (see FIGS. 1 and 2) is connected at its ends in chains 10 and 11. These ends are received between upward extending portions 19 and 21 of a link 14 carried in chains 10 and 11 and these ends are provided with apertures 26 and 27, which align with apertures 22 and 23 (see FIG. 4) in upwardly extending portions 19 and 21. Raddle slats 24 are joined to the upstanding portions by means of a rivet 28 (see FIG. 3) or the like which passes through apertures 22, 23 and 26, at one end and apertures 22, 23 and 27 at the other end.

Raddle slat 24 is provided with a base portion 29 (see FIG. 2) which contacts floor 6, and two offset portions 30 and 31 which contact the upper surface of base portion 16.

From the foregoing, it is seen that means have been provided in a raddle slat conveyor which permits easy removal and replacement of a raddle slat while the conveyor is in a machine such as a combine harvester. All that need be done is to remove two rivets 28 which hold the slat in slat links 14 and these rivets are readily accessible as they extend horizontally, or the old slat and rivet may be sawed and thus simultaneously removed. The old slat is removed and replaced by a new one, and two new rivets or the like are inserted.

It is to be noted that the slat forms a closure for the links 14 and the curved portions 17 and 18 of the links 14 from seats for receiving portions of the adjoining square links 12. A portion of the slat acts as a spacer for these portions of links 12 and maintains same in the curved portions 17 and 18.

The embodiments of the invention in which an exclusive property or privilege is claimed are defined as follows:

In combination in a raddle conveyor including a pair of transversely spaced endless chains connected at longitudinally spaced intervals by raddle slats and a floor over which said chains and said raddle slats move, the improvement comprising each said chain including forked links with each link having a base the lower surface of which contacts said floor and wherein portions of opposed sides said links are bowed outwardly adacent to and above the bases of said links to provide openings in which adjacent links are received, said links each being provided with continuations of said bowed portions, said raddle slats each being provided with a pair of longitudinally spaced transversely extending side surfaces which are complementary to said continuations of said bowed portions, said raddle slats being positioned with said side surfaces in contact with said continuations of said bowed portions to provide a closure for said forked links, said raddle slats each being provided with a pair of transversely spaced lower surfaces which are complementary to the upper surfaces of said bases and such lower surfaces being positioned in contact with said upper surfaces to provide spacing between said adjacent links, said raddle slats also being provided with a surface positioned between said lower surfaces parallel thereto and at a lower height in scraping contact with said floor, and retaining means passing through said continuations and said side surfaces for joining same.

References Cited by the Examiner

UNITED STATES PATENTS

| | | | |
|---|---|---|---|
| 855,290 | 5/1907 | Duffield | 198—175 X |
| 1,016,191 | 1/1912 | White | 198—175 |
| 1,484,972 | 2/1924 | Sipple | 198—175 |

FOREIGN PATENTS

| | | |
|---|---|---|
| 697,599 | 10/1940 | Germany. |
| 859,123 | 12/1952 | Germany. |
| 1,045,900 | 12/1958 | Germany. |

EVON C. BUNK, *Primary Examiner.*

M. L. AJEMAN, *Assistant Examiner.*